United States Patent [19]

Carroll et al.

[11] 4,270,318
[45] Jun. 2, 1981

[54] FIRE RESISTANT FITTING FLOOR HOLES

[75] Inventors: James C. Carroll, Hamilton, Ohio; Donald L. Chapman, Liberty, Ind.; Gilbert A. McGoldrick, Hamilton, Ohio

[73] Assignee: Square D Company, Palatine, Ill.

[21] Appl. No.: 961,089

[22] Filed: Nov. 15, 1978

[51] Int. Cl.³ .............................................. E04N 9/00
[52] U.S. Cl. .......................................... 52/1; 52/221; 52/232
[58] Field of Search ................ 52/232, 221, 1; 277/26

[56]  References Cited
U.S. PATENT DOCUMENTS

| 3,911,635 | 10/1975 | Traupe | 52/221 |
| 4,061,344 | 12/1977 | Bradley et al. | 52/232 X |

Primary Examiner—Carl D. Friedman
Attorney, Agent, or Firm—Larry I. Golden; Richard T. Guttman; Norton Lesser

[57]   ABSTRACT

A fire resistant fitting for use in sealing a floor hole and including a pair of plates having an expandable material therebetween for securing the fitting in the hole and a fire resistant material suspended in the opening from the lower plate by a simple twistable metal tang.

11 Claims, 3 Drawing Figures

FIRE RESISTANT FITTING FLOOR HOLES

BACKGROUND OF THE INVENTION

1. Field of the Invention

This invention relates in general to fire resistant fittings for use in floor openings and, more particularly, to an improved and more economical removable fire resistant fitting assembly for use in floor openings either preparatory to the use of or after abandonment of a through floor electric fitting.

2. Summary of the Prior Art

Arrangements for extending power and/or communication lines through a floor, while sealing the floor opening against the passage of heated or combustion air, incorporate an electrical fitting, having a fire resistant expandable or intumescent material as for example seen in an application filed by Carroll et al simultaneously herewith. Since floor openings for such arrangements may be provided for contemplated uses, which may not materialize, or previously utilized electrical fittings may be withdrawn to leave an empty or abandoned floor opening, it is desirable to provide a fire resitant fitting in the empty floor opening to optionally seal the opening with a minimum of expense.

3. Summary of the Present Invention

The present invention incorporates a simple and unique concept in a fitting assembly for sealing abandoned or empty floor passages against fire or a like condition. The fitting assembly incorporates a pair of plates, having a rubber ring member therebetween, which is subject to radial outward pressure, between the two plates when the lower plate is drawn toward the upper plate to secure the fittings in the opening. The lower plate has a slot receiving a flat tang or tab projecting through a slab of fire resitant expandable material, which seats on the head of the tang. The projecting tab is simply twisted against the slot sides to lock the tang on the fitting and suspend the fire resistant material in the opening.

It is, therefore, one object of the present invention to provide a more economical fire resistant fitting assembly for use in an empty floor opening.

It is another object of the present invention to provide an improved fire resistant fitting assembly for use in floor openings intended to receive fittings extending electrical lines through a floor.

Other objects and features of the present invention will become apparent on the examination of the following specification and claims, together with the drawings.

DESCRIPTION OF THE PREFERRED EMBODIMENT

Figure 1:
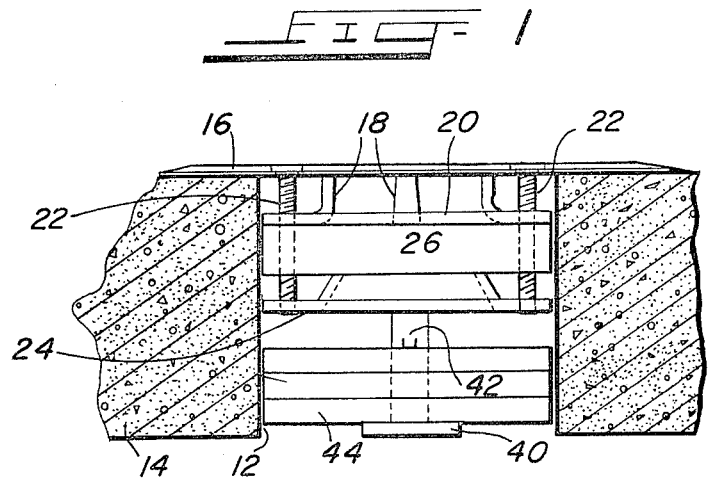
FIG. 1 is a side elevational view of a fitting assembly seated in a floor opening and incorporating the principles of the present invention.
Figure 2:
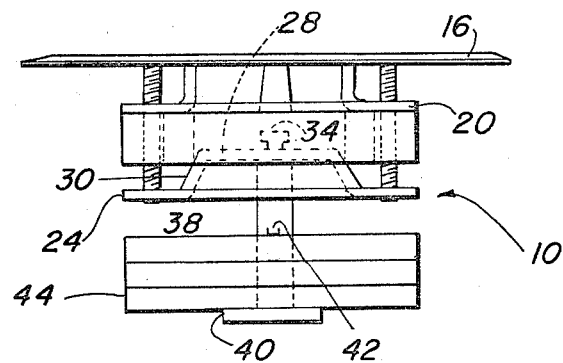
FIG. 2 is a side elevational view of the fitting assembly shown in FIG. 1 illustrating additional details.

In FIGS. 1 and 2 a fire resistant fitting assembly commonly called an abandoned outlet fitting is indicated generally by the reference character 10. The fitting 10 is shown assembled to a passage 12 in a floor 14, after or before the passage receives a fitting of the type described in the aforementioned Carroll et al application.

The assembly 10 comprises a metal plate 16 overlapping the opening 12 and engaged with the floor surface above the opening 12. A plurality of tabs 18 extend upwardly from another plate 20 in the opening to secure plate 20 in the opening 12 to the plate 16. The plate 20 has a diameter closely conforming to the diameter of opening 12, which is nominally 3", and a plurality of bolts 22 extend through plate 20 for threaded engagement with a second metal plate 24 spaced below plate 20.

The heads of the bolts are accessible through respective openings in plate 16 to enable plate 24 to be drawn toward plate 20 to apply pressure to a ring 26 of soft neoprene rubber located between the plates when the bolts are operated to draw the plates together in a manner similar to that explained in the aforementioned Carroll application.

It will be noted that plate 24 has a generally cup shaped to define a central offset portion 28 offset in the direction of plate 20 and seated within the inner diameter of ring 26. The connecting portion or axially extending rim wall 30 of the cup shaped portion of plate 24 is angled outwardly toward a disc portion of plate 24 so that when the plates are moved toward each other a radially outwardly directed pressure is applied to ring 26 to secure the assembly in the opening.

Figure 3:
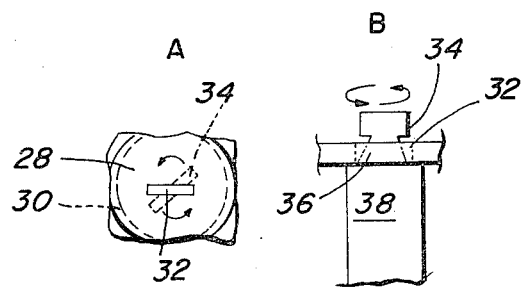
FIG. 3 is a fragmentary schematic illustration of the manner in which the tang carrying the fire resistant material is secured.

The offset portion 28 has a slot or passage 32 as best seen in FIG. 3. The slot 32 receives or passes a tab 34 at the free end of a thin neck section 36 located in the slot 32 and projecting from the end of an elongate metal tang 38 formed of sheet stock having a rectangular cross section. The tab 34 is offset or twisted from the plane of tang 38 to suspend the tang 38 together with an intergally formed head 40 on the other end of tang 38 from the plate 24. Seated on the head 40 and secured thereto by locking finger 42 is a disc or slab of fire resistant expandable material 44.

The material of disc 44 may be of a fire resistant type such as that by the 3M Company of St. Paul, Minn. under the Name of "3M Firestop Material", #FS-195. The disc 44 may actually comprise a number of 174 " thick discs or a single disc of selected axial thickness and it expands on exposure to heat to seal the passage 12. It will be appreciated that other types of material may be suitable including intumescent fire resistant materials.

To assemble the fitting 10 in the floor 14, a fitting of the type described in the aforementioned Carroll et al application is removed from the hole or passage 12 or the hole is initially formed in the floor to a selected size for just receiving a fitting such as 10. The plate 24 carrying the tang 38 and fire resistant material 44 is lowered into the hole while secured to discs 20 and 16 by bolts 22 with the ring 26 between plates 20 and 24 until the floor plate 16 engages the floor. The bolts of course each extend through a respective passage in ring 26.

The bolts 22 are then operated to further thread into the threaded openings of the lower disc 24. As the threading operation occurs the lower disc 24 is drawn upwards towards the upper disc 20 since the floor plate 16 and disc 20 cannot move downwardly, thereby expanding the ring 26 outwardly against the periphery of the opening 12. The periphery of the ring 26 thereby engages the periphery of the floor opening to tightly secure the assembly in passage 12. If desired stops may be provided on the bolts as explained in the aforementioned Carroll et al application to prevent excessive compression of the ring as explained in the aforementioned application.

Thereafter, if heated air resulting from combustion or other problem, should enter passage 12, the material of disc 44 swells or expands to form a hard cake-like material sealing the passage 12. The material is impervious to most fire temperatures and prevents combustion or heated air from passing through the floor opening to the floor above.

The foregoing constitutes a description of an improved fire resistant empty hole floor fitting whose inventive concepts are believed set forth in the accompanying claims.

What we claim is:

1. A fitting assembly for insertion in a floor passage extending through a floor, the improvement comprising;
    a top plate;
    a bottom plate; said top and bottom plates each having a periphery shaped and dimensioned to be received in said floor passage,
    an expandable rubber ring between said top and bottom plates;
    securing means extending through said top plate and engaged in said bottom plate for positioning said top plate with respect to said bottom plate and for moving said bottom plate towards said top plate to expand said ring between said plates for securing said assembly within said floor passage;
    said top and bottom plates, said rubber ring and said securing means comprising a sub-assembly,
    an expandable fire resistant material carried by said sub-assembly on the side of said bottom plate opposite from the side on which said top plate is located, said material being adapted to swell upon exposure to heat to seal said floor passage, and
    carrying means for carrying said material on the side of said bottom plate opposite from the side on which said top plate is located.

2. In the assembly claimed in claim 1, a third plate having spaced passages therein enabling access to said securing means and secured to said top plate with said third plate having a perimeter larger than said passage through said floor for overlapping said passage through said floor.

3. The assembly claimed in claim 2 in which said securing means comprises a plurality of spaced bolts each extending through said third plate and said top plate and threadingly engaged in said bottom plate, said top plate having a plurality of tabs extending upwardly toward said third plate to space said top plate a predetermined distance from said third plate upon installation of said assembly.

4. The assembly claimed in claim 3 in which said bottom plate has an offset central portion and an outer portion, said central portion adapted to be received within the inner diameter of said ring, said bottom plate also having a radially outwardly extending rim wall portion extending from said offset portion toward said outer portion to apply a radially outwardly directed force on said ring in response to the threading of each bolt in said bottom plate to move said bottom plate toward said top plate, said bolts threadingly engaging said outer portion of said bottom plate.

5. The assembly claimed in claim 4 in which said third plate has a plurality of spaced openings therein each aligned with a respective one of said bolts.

6. A fitting assembly for insertion in a floor passage extending through a floor, the improvement comprising;
    a pair of plates, each having a periphery shaped and dimensioned to be received in said passage,
    an expandable ring between said plates, a plurality of spaced bolts each extending through said one plate and ring and engaged in the other plate for securing one plate to the other plate and for moving said other plate towards the one plate to expand said ring between said plates and secure said plates to opposite sides of said ring,
    an expandable fire resistant material adapted to swell on exposure to heat to seal said passage,
    means suspending said fire resistant material from said other plate,
    said other plate having an offset portion adapted to be received within the inner diameter of said ring, and said other plate having a radially outwardly extending portion extending from said offset portion to apply a radially outwardly directed force on said ring in response to the threading of each bolt in said other plate to move said other plate toward said one plate,
    a third plate having spaced passages therein enabling access to said plurality of spaced bolts and secured to said one plate with said third plate having a perimeter larger than said passage though said floor for overlapping said passage through said floor, said third plate having a plurality of spaced openings therein each aligned with a respective one of said bolts, said means suspending said fire resistant material comprising a tang extending through said fire resistant material and having supporting means adjacent one end for supporting said fire resistant material, a non-circular portion adjacent the other end of said tang and extending through said other plate, and a tab on the other end of said tang offset from said non-circular portion and secured thereto for engaging the surface of said other plate opposite the surface facing said fire resistant material for suspending said tang and fire resistant material from said other plate.

7. The assembly claimed in claim 6 in which a locking finger is formed on said tang for capturing said fire resistant material between said supporting means and said finger.

8. The assembly claimed in claim 7 in which said locking finger and said supporting means are integrally formed on said tang.

9. A fire resistant floor fitting for insertion in a floor passage comprising:
    a pair of plates each having a pair of spaced passages and each sized for receipt in said floor passage,
    a pressure expandable ring located between said plates,
    a threaded member extending through one plate and threaded into the other plate for threadingly moving said one plate towards the other plate, means on said other plate for exerting a radially outwardly directed force on said ring, to pressure expand said ring against the periphery of said floor passage,
    disc means of fire resistant material,
    support means engaging one surface of said fire resistant material and having a tang extending through said fire resistant material, and securing means for securing said tang to said other plate to support said fire resistant material in said passage.

10. The fire resistant floor fitting claimed in claim 9 in which said support means and said securing means are integrally formed with said tang.

11. The fire resistant floor fitting claimed in claim 9 in which said other plate is cup shaped with a rim wall inclined radially outwardly in an axial direction from said first plate.

* * * * *

UNITED STATES PATENT AND TRADEMARK OFFICE
CERTIFICATE OF CORRECTION

PATENT NO. : 4,270,318
DATED : June 2, 1981
INVENTOR(S) : J.C. Carroll, D.L. Chapman and G.A. McGoldrick It is certified that error appears in the above—identified patent and that said Letters Patent is hereby corrected as shown below:

Col. 2, line 44 "174" should read --1/4"--.

Signed and Sealed this

Ninth Day of October 1984

[SEAL]

Attest:

GERALD J. MOSSINGHOFF

Attesting Officer

Commissioner of Patents and Trademarks